US009720144B2

(12) United States Patent
Kadomi et al.

(10) Patent No.: US 9,720,144 B2
(45) Date of Patent: Aug. 1, 2017

(54) LIQUID CRYSTAL LENS AND CELL FOR LIQUID CRYSTAL LENS

(71) Applicant: NIPPON ELECTRIC GLASS CO., LTD., Otsu-shi, Shiga (JP)

(72) Inventors: Masaaki Kadomi, Otsu (JP); Masanori Wada, Otsu (JP); Hirokazu Tanaka, Otsu (JP); Takasi Akimoto, Nagahama (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 485 days.

(21) Appl. No.: 14/373,950

(22) PCT Filed: Jan. 9, 2013

(86) PCT No.: PCT/JP2013/050197
§ 371 (c)(1),
(2) Date: Jul. 23, 2014

(87) PCT Pub. No.: WO2013/118525
PCT Pub. Date: Aug. 15, 2013

(65) Prior Publication Data
US 2015/0268387 A1    Sep. 24, 2015

(30) Foreign Application Priority Data
Feb. 10, 2012    (JP) ................... 2012-026826

(51) Int. Cl.
*G02F 1/1343*    (2006.01)
*G02B 3/14*    (2006.01)
*G02F 1/29*    (2006.01)

(52) U.S. Cl.
CPC ......... *G02B 3/14* (2013.01); *G02F 1/134309* (2013.01); *G02F 1/29* (2013.01); *G02F 2001/294* (2013.01); *G02F 2201/122* (2013.01)

(58) Field of Classification Search
CPC ......... G02F 1/136286; G02F 1/133707; G02F 1/29; G02F 1/134309; G02F 2001/294; G02F 2201/122; G02B 3/14
(Continued)

(56) References Cited

U.S. PATENT DOCUMENTS

2004/0108984 A1    6/2004  Ogasawara
2007/0127348 A1    6/2007  Ooi et al.

FOREIGN PATENT DOCUMENTS

CN    101088041 A    12/2007
CN    101630105 A    1/2010
(Continued)

OTHER PUBLICATIONS

Official Communication issued in International Patent Application No. PCT/JP2013/050197, mailed on Mar. 12, 2013.
(Continued)

*Primary Examiner* — Nathanael R Briggs
*Assistant Examiner* — William Peterson
(74) *Attorney, Agent, or Firm* — Keating and Bennett, LLP

(57) ABSTRACT

Provided is a liquid crystal lens having low wavefront aberration. A liquid crystal lens (1) includes a liquid crystal layer (11), a first electrode (21), a second electrode (22), and a third electrode (23). The first electrode (21) is provided with an opening (21a) and a communicating cutout (21b) formed therein, the communicating cutout (21b) allowing the opening (21a) to communicate with the outside. The second electrode (22) includes a main electrode portion (22a) and a linear leading electrode portion (22b). The main electrode portion (22a) is disposed within the opening (21a). The main electrode portion (22a) is electrically insulated from the first electrode (21). The leading electrode portion (22b) is electrically connected to the main electrode portion
(Continued)

(22a). The leading electrode portion (22b) is disposed within the communicating cutout (21b). The third electrode (23) faces at least part of the first and second electrodes (21, 22). A junction of the leading electrode portion (22b) with the main electrode portion (22a) has a width of 70 μm or less.

5 Claims, 5 Drawing Sheets

(58) Field of Classification Search
USPC .......................................................... 349/139
See application file for complete search history.

(56) References Cited

FOREIGN PATENT DOCUMENTS

| JP | 10-112058 A | 4/1998 |
|---|---|---|
| JP | 2004-101885 A | 4/2004 |
| JP | 2004-110959 A | 4/2004 |
| JP | 2006-012344 A | 1/2006 |
| JP | 2006012344 * | 1/2006 |
| JP | 2010-055666 A | 3/2010 |
| JP | 2011-017742 A | 1/2011 |
| JP | 2011-180373 A | 9/2011 |
| JP | 2011180373 * | 9/2011 |
| WO | 2006/009176 A1 | 1/2006 |
| WO | 2006/050366 A2 | 5/2006 |

OTHER PUBLICATIONS

Official Communication issued in corresponding International Application PCT/JP2013/050197, mailed on Aug. 21, 2014.
Official Communication issued in corresponding Chinese Patent Application No. 201380008962.5, mailed on Jan. 19, 2016.

* cited by examiner

[FIG. 1]
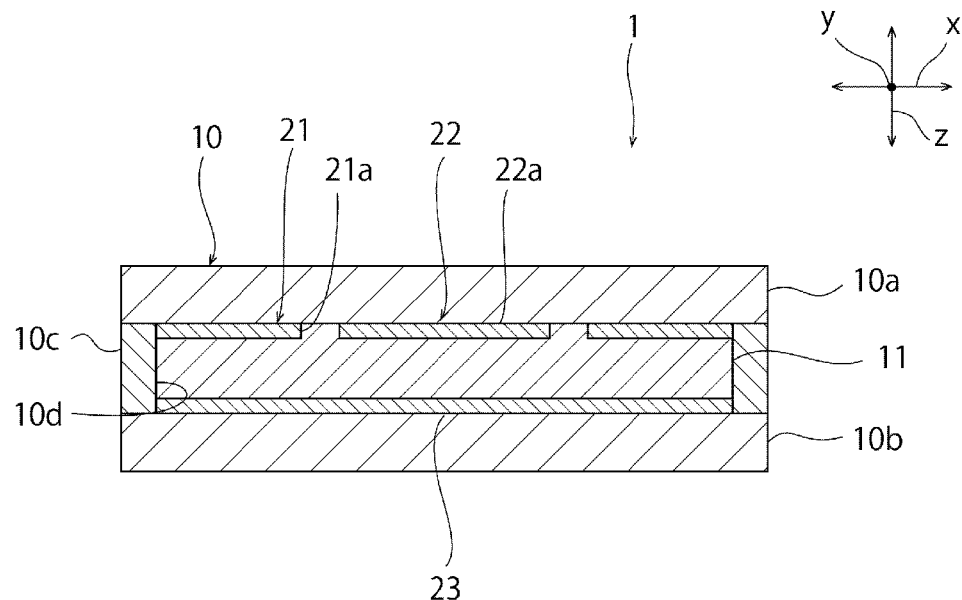
[FIG. 2]
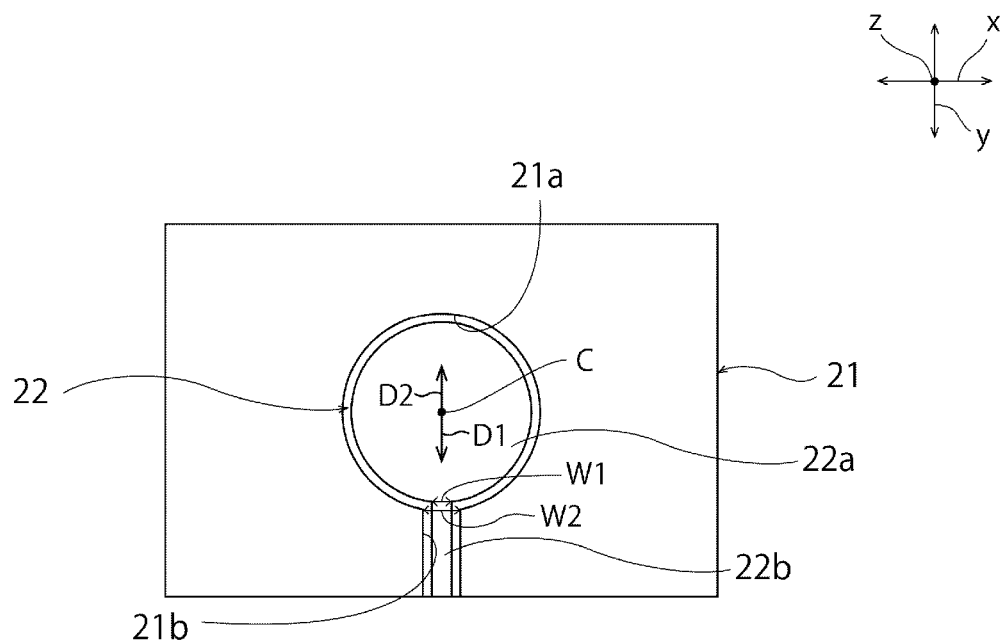

[FIG. 3]
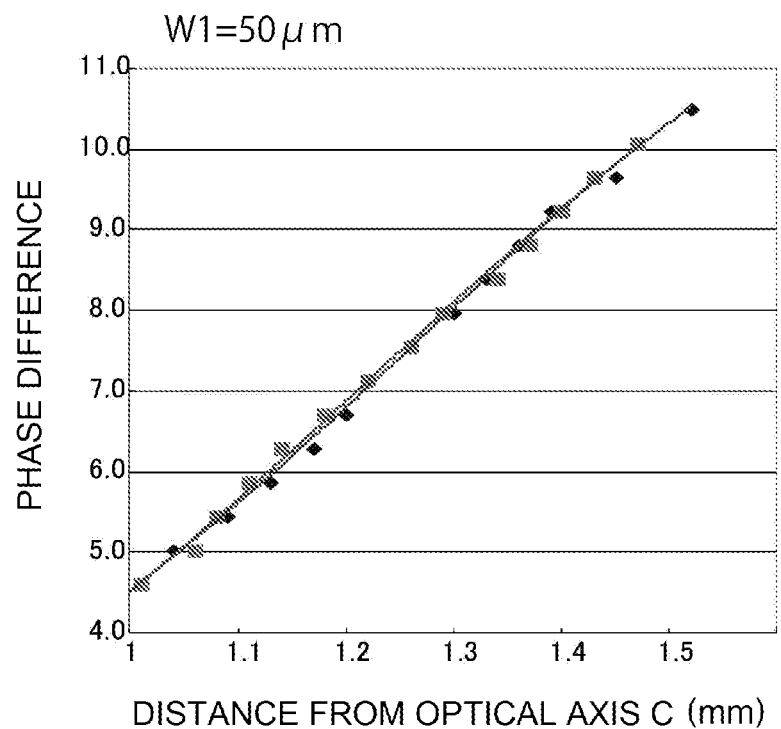
[FIG. 4]
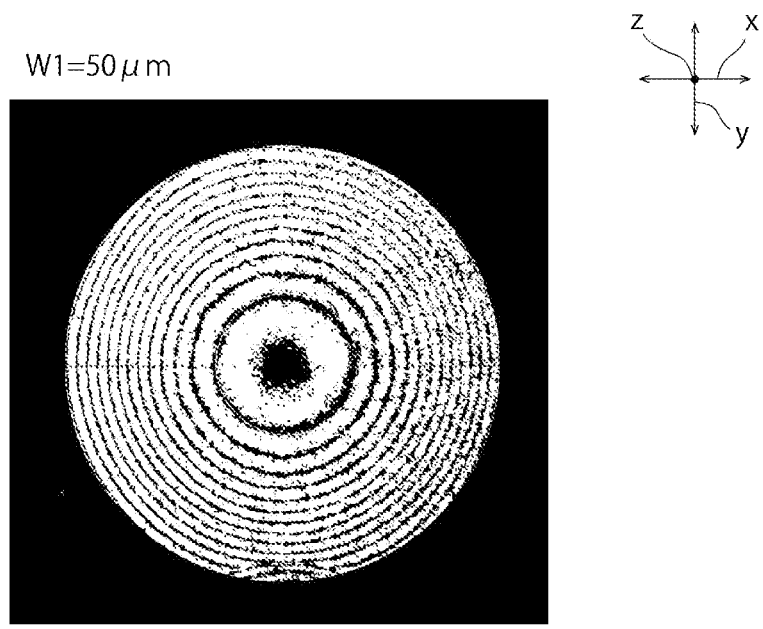

[FIG. 5]
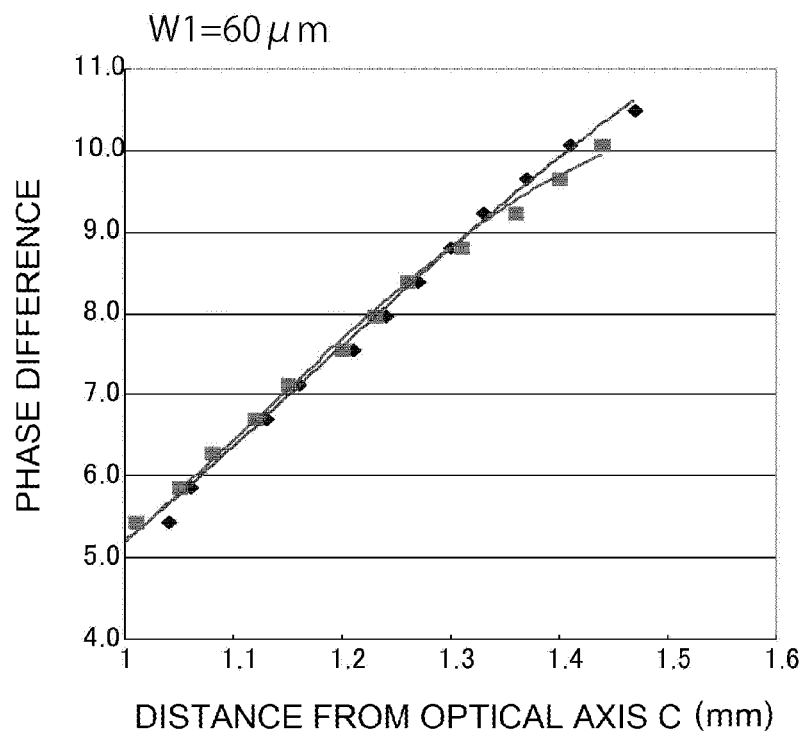
[FIG. 6]
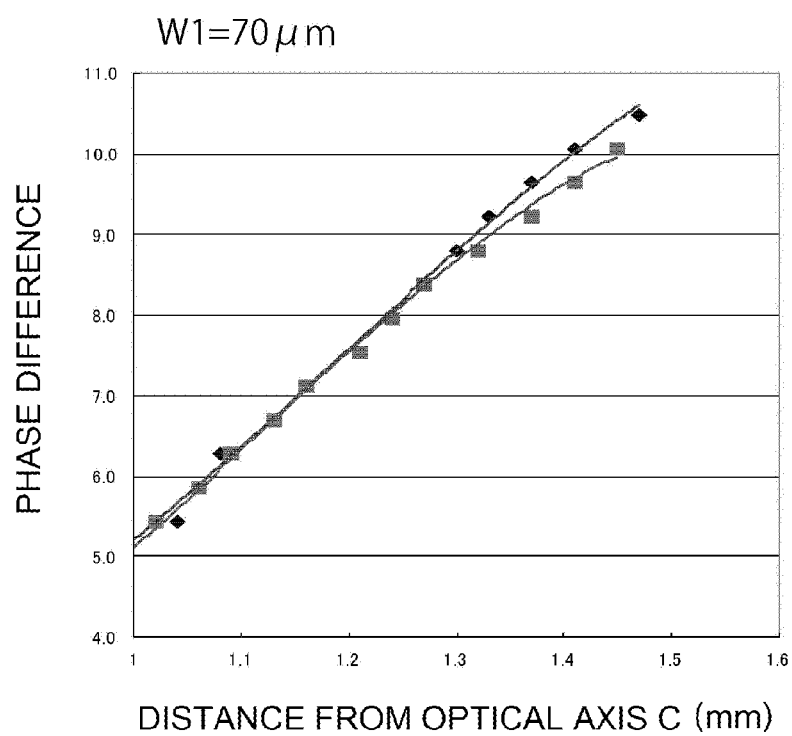

[FIG. 7]
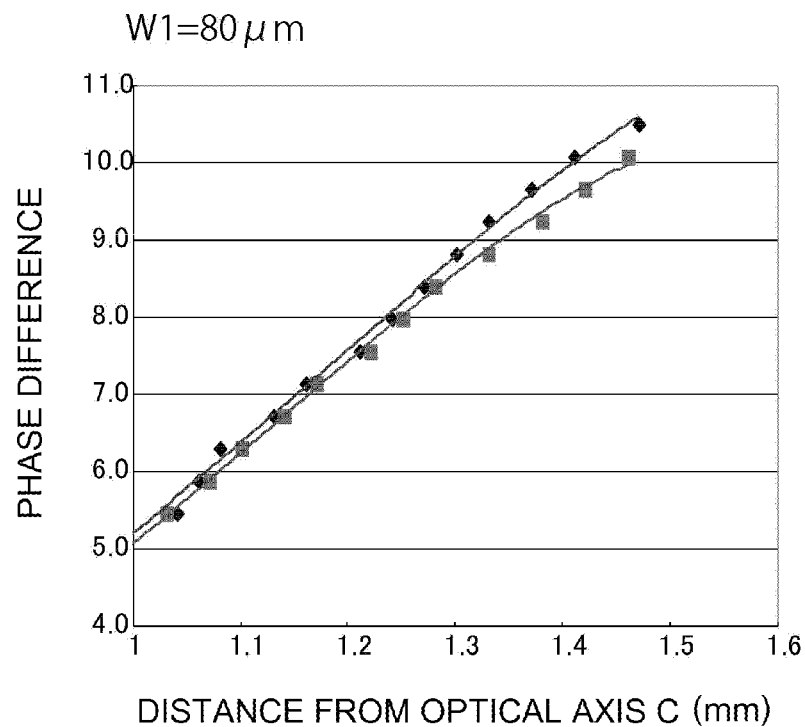
[FIG. 8]
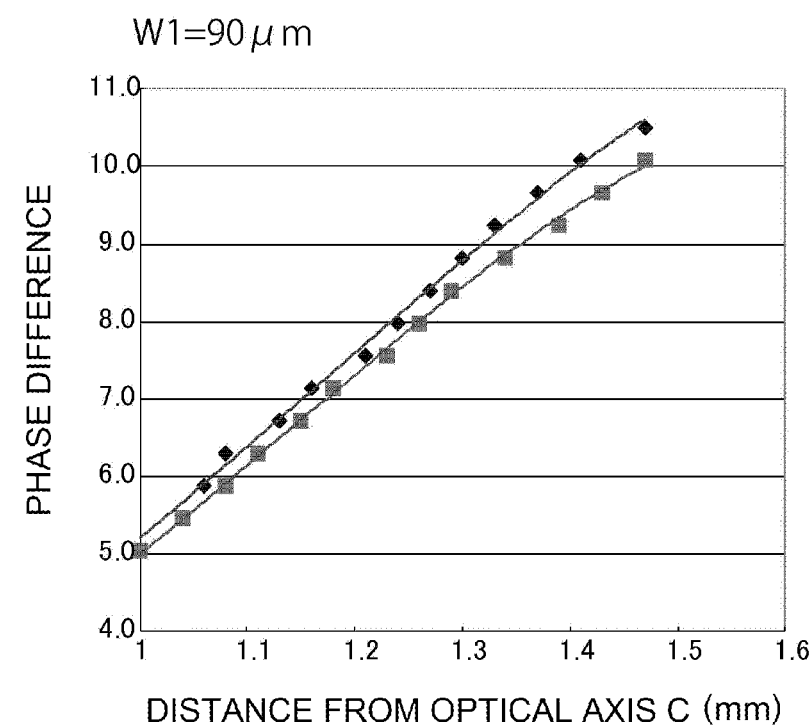

[FIG. 9]
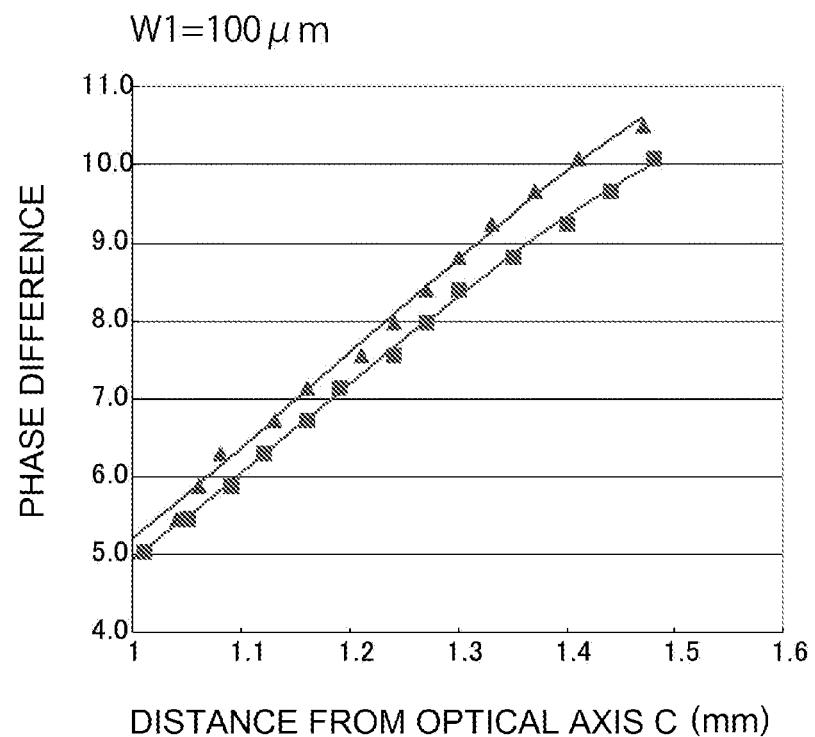
[FIG. 10]
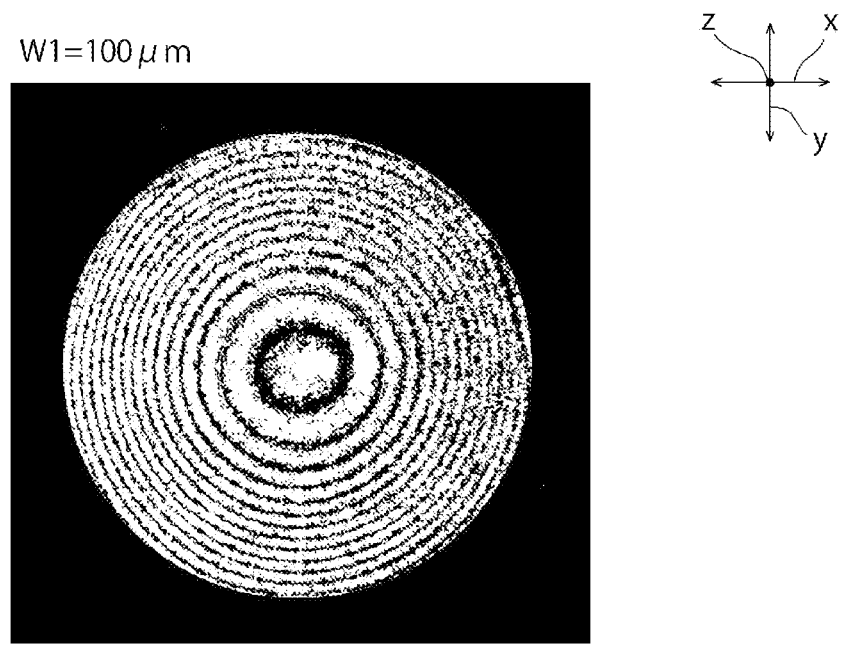

LIQUID CRYSTAL LENS AND CELL FOR LIQUID CRYSTAL LENS

TECHNICAL FIELD

This invention relates to liquid crystal lenses and cells for liquid crystal lenses.

BACKGROUND ART

Recently, attention has been increasingly focused on such liquid crystal lenses as described in, for example, Patent Literature 1. In such a liquid crystal lens, its optical power can be changed by changing the voltage applied to its liquid crystal layer to change the refractive index of the liquid crystal layer. Therefore, with the use of the liquid crystal lens, the optical system can be compactified and enhanced in capabilities.

CITATION LIST

Patent Literature

Patent Literature 1: JP-A-2011-17742

SUMMARY OF INVENTION

Technical Problem

In extending the range of applications of the liquid crystal lens, it is important to improve the wavefront aberration of the liquid crystal lens.

The present invention lies in providing a liquid crystal lens having low wavefront aberration.

Solution to Problem

A liquid crystal lens according to the present invention includes a liquid crystal layer, a first electrode, a second electrode, and a third electrode. The first electrode is disposed on one side of the liquid crystal layer. The first electrode is provided with an opening and a communicating cutout formed therein, the communicating cutout allowing the opening to communicate with the outside. The second electrode includes a main electrode portion and a linear leading electrode portion. The main electrode portion is disposed on the one side of the liquid crystal layer and within the opening. The main electrode portion is electrically insulated from the first electrode. The leading electrode portion is electrically connected to the main electrode portion. The leading electrode portion is disposed within the communicating cutout. The third electrode is disposed on the other side of the liquid crystal layer. The third electrode faces at least part of the first and second electrodes. A junction of the leading electrode portion with the main electrode portion has a width of 70 µm or less.

The junction of the leading electrode portion with the main electrode portion preferably has a width of 50 µm or less.

The opening preferably has a circular shape and the main electrode portion preferably has a circular shape having a smaller diameter than the opening.

A junction of the communicating cutout with the opening preferably has a width of 150 µm or less.

The junction of the communicating cutout with the opening preferably has a width at least 20 µm greater than the junction of the leading electrode portion with the main electrode portion.

A cell for a liquid crystal lens according to the present invention includes a cell body, a first electrode, a second electrode, and a third electrode. The cell body includes an interior space into which liquid crystal is to be filled. The first electrode is disposed on one side of the interior space. The first electrode is provided with an opening and a communicating cutout formed therein, the communicating cutout allowing the opening to communicate with the outside. The second electrode is disposed on the one side of the interior space and within the opening. The second electrode includes a main electrode portion and a linear leading electrode portion. The main electrode portion is electrically insulated from the first electrode. The leading electrode portion is electrically connected to the main electrode portion. The leading electrode portion is disposed within the communicating cutout. The third electrode is disposed on the other side of the interior space. The third electrode faces at least part of the first and second electrodes. A junction of the leading electrode portion with the main electrode portion has a width of 70 µm or less.

Advantageous Effects of Invention

The present invention can provide a liquid crystal lens having low wavefront aberration.

BRIEF DESCRIPTION OF DRAWINGS

FIG. 1 is a schematic cross-sectional view of a liquid crystal lens according to one embodiment of the present invention.

FIG. 2 is a schematic plan view of first and second electrodes in the one embodiment of the present invention.

FIG. 3 is a graph showing phase differences when the junction of a leading electrode portion with a main electrode portion has a width of 50 µm.

FIG. 4 is a photograph of wavefront aberration when the junction of the leading electrode portion with the main electrode portion has a width of 50 µm.

FIG. 5 is a graph showing phase differences when the junction of the leading electrode portion with the main electrode portion has a width of 60 µm.

FIG. 6 is a graph showing phase differences when the junction of the leading electrode portion with the main electrode portion has a width of 70 µm.

FIG. 7 is a graph showing phase differences when the junction of the leading electrode portion with the main electrode portion has a width of 80 µm.

FIG. 8 is a graph showing phase differences when the junction of the leading electrode portion with the main electrode portion has a width of 90 µm.

FIG. 9 is a graph showing phase differences when the junction of the leading electrode portion with the main electrode portion has a width of 100 µm.

FIG. 10 is a photograph of wavefront aberration when the junction of the leading electrode portion with the main electrode portion has a width of 100 µm.

DESCRIPTION OF EMBODIMENTS

Hereinafter, a description will be given of a preferred embodiment for working of the present invention. However, the following embodiment is simply illustrative. The present invention is not at all intended to be limited to the following embodiment.

Throughout the drawings to which the embodiment and the like refer, elements having substantially the same functions will be referred to by the same reference signs. The drawings to which the embodiment and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

FIG. 1 shows a schematic cross-sectional view of a liquid crystal lens 1 according to this embodiment.

As shown in FIG. 1, the liquid crystal lens 1 includes an element body (cell body) 10. The element body 10 and first to third electrodes 21 to 23 to be described hereinafter constitute a cell for a liquid crystal lens. The element body 10 includes a first main wall portion 10a, a second main wall portion 10b, and a sidewall portion 10c. These first and second main wall portions 10a, 10b and sidewall portion 10c define a cylindrical interior space 10d. The interior space 10d can be filled with liquid crystal to form a liquid crystal lens 1. Liquid-crystal inlets for use in filling liquid crystal into the interior space 10d may be provided in either one of the main wall portions 10a, 10b or in the sidewall portion 10c.

The interior space 10d of the liquid crystal lens 1 is provided with a liquid crystal layer 11. The liquid crystal layer 11 may be divided into a plurality of sections along the thickness direction z by one or more intermediate sheets made of, for example, glass. In such a case, each intermediate sheet may be provided with a communicating hole to allow the plurality of liquid crystal layers to communicate with each other. Thus, pressure variations among the plurality of liquid crystal layers can be reduced.

The liquid crystal layer 11 is sandwiched by the first and second electrodes 21, 22 provided on one side thereof in the thickness direction z and the third electrode 23 provided on the other side thereof in the thickness direction z.

The first and second electrodes 21, 22 are disposed on a main surface of the first main wall portion 10a located close to the liquid crystal layer 11. Provided on the main surface of the first main wall portion 10a located close to the liquid crystal layer 11 is an alignment film (not shown) covering the first and second electrodes 21, 22.

The third electrode 23 is disposed on a main surface of the second main wall portion 10b located close to the liquid crystal layer 11. The third electrode 23 is provided to face at least part of the first and second electrodes 21, 22 in the thickness direction z. In this embodiment, specifically, the third electrode 23 is provided to face the entire surfaces of the first and second electrodes 21, 22 in the thickness direction z. Provided on the main surface of the second main wall portion 10b located close to the liquid crystal layer 11 is an alignment film (not shown) covering the third electrodes 23.

In the liquid crystal lens 1, a voltage V1 is applied between the first electrode 21 and the third electrode 23 and a voltage V2 is applied between the second electrode 22 and the third electrode 23. By changing the voltages V1, V2, the orientation of liquid crystal molecules contained in the liquid crystal layer 11 is changed. As a result, the optical power of the liquid crystal lens 1 is changed.

FIG. 2 shows a schematic plan view of the first and second electrodes in this embodiment. Next, referring mainly to FIG. 2, a detailed description will be given of the structures of the first and second electrodes 21, 22.

The first electrode 21 is provided with an opening 21a and a communicating cutout 21b both of which are formed therein. The opening 21a has a circular shape.

The communicating cutout 21b allows the opening 21a to communicate with the outside of the first electrode 21. In other words, the communicating cutout 21b connects the opening 21a to the outer perimeter of the first electrode 21. In this embodiment, the communicating cutout 21b is provided linearly. However, the present invention is not limited to this configuration. For example, the communicating cutout 21b may be provided curvilinearly.

The second electrode 22 includes a main electrode portion 22a and a leading electrode portion 22b. The main electrode portion 22a is disposed within the opening 21a. The main electrode portion 22a is electrically insulated from the first electrode 21. The main electrode portion 22a has a circular shape. More specifically, the main electrode portion 22a has a circular shape having a smaller diameter than the opening 21a. The diameter of the main electrode portion 22a can be, for example, about 0.1 mm to about 30 mm.

The leading electrode portion 22b is electrically connected to the main electrode portion 22a. The leading electrode portion 22b is electrically insulated from the first electrode 21. The leading electrode portion 22b is disposed within the communicating cutout 21b. The leading electrode portion 22b extends linearly outwardly from the main electrode portion 22a. The leading electrode portion 22b reaches the outer perimeter of the first electrode 21. In this embodiment, the leading electrode portion 22b is provided linearly. However, the present invention is not limited to this configuration. For example, the leading electrode portion 22b may be provided curvilinearly.

The width W1 of the junction of the leading electrode portion 22b with the main electrode portion 22a is 70 μm or less and more preferably 50 μm or less. The ratio of the width W1 of the junction of the leading electrode portion 22b with the main electrode portion 22a to the diameter of the main electrode portion 22a ((the width W1 of the junction of the leading electrode portion 22b with the main electrode portion 22a)/(the diameter of the main electrode portion 22a)) is preferably 0.023 or less and more preferably 0.017 or less. The width W2 of the junction of the communicating cutout 21b with the opening 21a preferably 150 μm or less, more preferably 110 μm or less, and still more preferably 100 μm or less. However, from the viewpoint of avoiding deterioration of the power durability, the width W2 of the junction of the communicating cutout 21b with the opening 21a is preferably at least 20 μm greater than the width W1 of the junction of the leading electrode portion 22b with the main electrode portion 22a.

As described above, in the liquid crystal lens 1, the width W1 of the junction of the leading electrode portion 22b with the main electrode portion 22a is 70 μm or less. Therefore, the liquid crystal lens 1 has low wavefront aberration.

Although it is not known exactly why wavefront aberration can be reduced by setting the width W1 of the junction of the leading electrode portion 22b with the main electrode portion 22a at 70 μm or less, there is a possible reason below.

In order to connect a power source to the main electrode portion, it is conceivable to electrically connect a leading electrode led out to the outside of the first electrode to the main electrode portion. However, when the leading electrode is provided, the shape of the second electrode is non-point symmetric. Thus, a generated electric line of force has low point symmetry. Therefore, wavefront aberration can be assumed to be increased.

Even if the width W1 of the junction of the leading electrode portion 22b with the main electrode portion 22a is reduced to 70 μm or less, the shape of the second electrode 22 is not point symmetric. However, the leading electrode portion 22b is sufficiently narrow, which can be assumed to reduce the lowering of the point symmetry of the generated electric line of force, resulting in providing low wavefront aberration.

From the viewpoint of further lowering the wavefront aberration, the width W1 of the junction of the leading electrode portion 22b with the main electrode portion 22a is preferably 50 μm or less. Furthermore, the width W2 of the junction of the communicating cutout 21b with the opening 21a is preferably 150 μm or less, more preferably 110 μm or less, and still more preferably 100 μm or less.

FIG. 3 is a graph showing phase differences when the width of the leading electrode portion 22b is 50 μm. FIG. 4 is a photograph of wavefront aberration when the width of the leading electrode portion 22b is 50 μm. FIG. 5 is a graph showing phase differences when the width of the leading electrode portion 22b is 60 μm. FIG. 6 is a graph showing phase differences when the width of the leading electrode portion 22b is 70 μm. FIG. 7 is a graph showing phase differences when the width of the leading electrode portion 22b is 80 μm. FIG. 8 is a graph showing phase differences when the width of the leading electrode portion 22b is 90 μm. FIG. 9 is a graph showing phase differences when the width of the leading electrode portion 22b is 100 μm. FIG. 10 is a photograph of wavefront aberration when the width of the leading electrode portion 22b is 100 μm.

In the graphs shown in FIGS. 3 and 5 to 9, the abscissa represents the distance from the optical axis C and the ordinate represents the phase difference from the optical axis C. In the graphs shown in FIGS. 3 and 5 to 9, data indicated by squares are data representing phase differences along the direction D1 shown in FIG. 2 (the radial direction from the optical axis C toward the middle of the leading electrode portion 22b) and data indicated by rhombuses are data representing phase differences along the direction D2 180° different from the direction D1. The plane shape of the main electrode portion is a circular shape having a radius of 1.5 mm.

As shown in FIGS. 7 to 10, it can be seen that when the width of the junction of the leading electrode portion with the main electrode portion is greater than 70 μm, the phase difference, not only in peripheral portions away from the optical axis C but also in the central portion near the optical axis C, differs between the direction where the leading electrode is provided and the direction where the leading electrode is not provided. On the other hand, as shown in FIGS. 3, 5, and 6, it can be seen that when the width of the junction of the leading electrode portion with the main electrode portion is 70 μm or less, the phase difference in the central portion is substantially comparable between the direction where the leading electrode is provided and the direction where the leading electrode is not provided. These results show that the wavefront aberration can be improved by setting the width of the junction of the leading electrode portion with the main electrode portion at 70 μm or less.

Furthermore, as shown in FIG. 3, it can be seen that when the width of the junction of the leading electrode portion with the main electrode portion is 50 μm, the phase difference, not only in the central portion but also in the peripheral portions, is substantially comparable between the direction where the leading electrode is provided and the direction where the leading electrode is not provided. These results show that the wavefront aberration can be more effectively improved by setting the width of the junction of the leading electrode portion with the main electrode portion at 50 μm or less.

Although in the liquid crystal lens 1 an example has been described where the leading electrode portion 22b has a constant width in the longitudinal direction. However, the present invention is not limited to this configuration. The width of the junction of the leading electrode portion 22b with the main electrode portion 22a may be different from the width of the portions thereof other than the junction. For example, the portions of the leading electrode portion 22b other than the junction may have a greater width than the junction thereof with the main electrode portion 22a. Likewise, the width of the communicating cutout 21b does not necessarily have to be constant. The width of the junction of the communicating cutout 21b with the opening 21a may be different from the width of the portions thereof other than the junction. For example, the portions of the communicating cutout 21b other than the junction may have a greater width than the junction thereof with the opening 21a.

REFERENCE SIGNS LIST

1 . . . liquid crystal lens
10 . . . element body
10a . . . first main wall portion
10b . . . second main wall portion
10c . . . sidewall portion
10d . . . interior space
11 . . . liquid crystal layer
21 . . . first electrode
21a . . . opening
21b . . . communicating cutout
22 . . . second electrode
22a . . . main electrode portion
22b . . . leading electrode portion
23 . . . third electrode

The invention claimed is:

1. A liquid crystal lens comprising:
a liquid crystal layer;
a first electrode disposed on one side of the liquid crystal layer and provided with an opening with a circular shape and a communicating cutout formed therein, the communicating cutout allowing the opening to communicate with the outside;
a second electrode disposed on the one side of the liquid crystal layer, the second electrode including a main electrode portion disposed within the opening and electrically insulated from the first electrode and a linear leading electrode portion electrically connected to the main electrode portion and disposed within the communicating cutout, the main electrode portion including a circular shape with a diameter that is smaller than a diameter of the opening; and
a third electrode disposed on the other side of the liquid crystal layer and facing at least part of the first and second electrodes, wherein
a junction of the leading electrode portion with the main electrode portion has a width of about 70 μm or less; and
a ratio of the width of the junction to the diameter of the main electrode portion is about 0.023 or less.

2. The liquid crystal lens according to claim 1, wherein the junction of the leading electrode portion with the main electrode portion has a width of 50 μm or less.

3. The liquid crystal lens according to claim 1, wherein a junction of the communicating cutout with the opening has a width of 150 μm or less.

4. The liquid crystal lens according to claim 3, wherein the junction of the communicating cutout with the opening has a width at least 20 µm greater than the junction of the leading electrode portion with the main electrode portion.

5. A cell for a liquid crystal lens comprising:
a cell body including an interior space into which liquid crystal is to be filled;
a first electrode disposed on one side of the interior space and provided with an opening with a circular shape and a communicating cutout formed therein, the communicating cutout allowing the opening to communicate with the outside;
a second electrode disposed on the one side of the interior space, the second electrode including a main electrode portion disposed within the opening and electrically insulated from the first electrode and a linear leading electrode portion electrically connected to the main electrode portion and disposed within the communicating cutout, the main electrode portion including a circular shape with a diameter that is smaller than a diameter of the opening; and
a third electrode disposed on the other side of the interior space and facing at least part of the first and second electrodes, wherein
a junction of the leading electrode portion with the main electrode portion has a width of about 70 µm or less; and
a ratio of the width of the junction to the diameter of the main electrode portion is about 0.023 or less.

* * * * *